United States Patent
Freienstein et al.

(10) Patent No.: US 8,649,937 B2
(45) Date of Patent: Feb. 11, 2014

(54) ENERGY ABSORBER AND METHOD FOR SETTING A STIFFNESS OF AN ENERGY ABSORBER

(75) Inventors: Heiko Freienstein, Weil der Stadt (DE); Kai Weeber, Heimsheim (DE); Markus Koenning, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 6 days.

(21) Appl. No.: 13/386,086

(22) PCT Filed: Jul. 8, 2010

(86) PCT No.: PCT/EP2010/059811
§ 371 (c)(1),
(2), (4) Date: Apr. 5, 2012

(87) PCT Pub. No.: WO2011/026673
PCT Pub. Date: Mar. 10, 2011

(65) Prior Publication Data
US 2012/0197489 A1 Aug. 2, 2012

(30) Foreign Application Priority Data
Sep. 4, 2009 (DE) .......................... 10 2009 029 212

(51) Int. Cl.
*B60R 19/18* (2006.01)
(52) U.S. Cl.
USPC ............................. 701/36; 293/132; 296/35.2
(58) Field of Classification Search
USPC ........... 701/36, 45–48, 34.4, 29.1, 30.9, 31.1, 701/31.2; 180/274, 271; 280/784; 293/102, 293/129, 131, 132, 135–137; 296/35.2, 189
See application file for complete search history.

(56) References Cited

U.S. PATENT DOCUMENTS

| | | | | |
|---|---|---|---|---|
| 5,311,963 A | * | 5/1994 | Shigeoka et al. | 180/274 |
| 6,224,120 B1 | | 5/2001 | Eipper et al. | |
| 7,240,959 B2 | | 7/2007 | Urushiyama et al. | |
| 7,407,191 B2 | | 8/2008 | Urushiyama | |
| 2004/0117091 A1 | * | 6/2004 | Prakah-Asante et al. | 701/45 |
| 2007/0164574 A1 | * | 7/2007 | Tanabe | 293/102 |

FOREIGN PATENT DOCUMENTS

| | | |
|---|---|---|
| DE | 19852959 | 5/2000 |
| DE | 10107873 | 9/2002 |
| DE | 102004040050 | 6/2005 |
| DE | 102005023915 | 1/2006 |
| DE | 102007059595 | 6/2009 |

OTHER PUBLICATIONS

International Search Report, PCT International Application No. PCT/EP2010/059811, dated Nov. 4, 2010.

* cited by examiner

*Primary Examiner* — Mary Cheung
*Assistant Examiner* — Rodney Butler
(74) *Attorney, Agent, or Firm* — Kenyon & Kenyon LLP

(57) ABSTRACT

An energy absorber for a vehicle is described, which includes a sensor integrated into the energy absorber, which is designed to detect an impact magnitude acting on the energy absorber and to provide information about the impact magnitude. Furthermore, the energy absorber includes at least one setting element, which is designed to set a stiffness of the energy absorber in response to the information about the impact magnitude.

8 Claims, 3 Drawing Sheets

ENERGY ABSORBER AND METHOD FOR SETTING A STIFFNESS OF AN ENERGY ABSORBER

FIELD OF THE INVENTION

The present invention relates to an energy absorber, a method for absorbing an impact energy, a control unit, and a computer program product.

BACKGROUND INFORMATION

German Patent Application No. DE 198 52 959 A1 describes a system of a bull bar on a motor vehicle bow, which is supported on load-bearing parts of the motor vehicle body using rigid rod profiles. The bull bar is extendable and may cause an extension of the crumple zone of the motor vehicle in case of crash.

Furthermore, impact absorbers (crash absorbers), e.g., in the form of crash boxes are used in the field of impact absorption (crash absorption), which have a defined stiffness. Crash boxes having defined stiffness are currently primarily used to meet demands of AZT crashes. Adaptive crash boxes are also used, which may change their stiffness depending on the situation, on the basis of a surroundings sensor system or pre-crash sensor system.

In addition, deformation elements are used, which may reduce their stiffness especially to improve pedestrian protection.

SUMMARY

In accordance with the present invention, an example energy absorber for a vehicle, an example method for setting a stiffness of an energy absorber, an example control unit which uses this method, and finally an example corresponding computer program product are provided.

The present invention relates to an adjustable energy absorber or an adjustable crash box having at least two states, which measures the crash severity to be expected on the basis of an internal sensor system, in or on the element itself, and changes or adapts the stiffness of the energy absorber in a targeted way in accordance with the situation.

In accordance with the present invention, an implementation of an adaptive energy absorber or an adaptive crash box having an integrated decision sensor system is provided. A part of the energy absorber may have an adjustable absorption structure, and another part may have a sensing unit for regulating the stiffness of the absorption structure. This adaptivity allows rapid stiffening, which may be switched on for a defined time, of the front vehicle section, and therefore a shortened design of the front vehicle section with identical protective action for the occupants. This results in a reduction of the weight of the vehicle, which in turn has a positive effect on the $CO_2$ balance of the vehicle. The energy absorber according to the present invention is independent of a predictive sensor system and therefore may be integrated into the vehicle independently thereof.

The present invention provides an example energy absorber for a vehicle having the following features: a sensor integrated into the energy absorber, which is designed to detect an impact magnitude acting on the energy absorber and to provide information about the impact magnitude; and at least one setting element, which is designed to set a stiffness of the energy absorber in response to the information about the impact magnitude.

The energy absorber may be designed as a crash box and may include at least one absorption element. The at least one absorption element may be designed to absorb and dissipate an impact energy acting on the energy absorber. The impact energy may result from a collision of the vehicle with an object, for example. The at least one absorption element may include an elastic element, for example, a spring, or a plastic element, for example, a friction element or a deformation element. The impact magnitude may represent an impact force or impact energy which acts directly on the energy absorber. The sensor may be situated inside or on the energy absorber, in order to detect the impact magnitude acting on the energy absorber. For example, the sensor may be designed to detect and analyze a deformation of the at least one absorption element which is caused by the impact magnitude. The sensor may therefore be designed to measure a deformation of a measuring section element of the energy absorber. The measuring section element may be rapidly deformable or elastic or have a low stiffness. In particular, the sensor may be designed to measure a speed or distance of the deformation directly on the energy absorber. The energy absorber is therefore independent of a surroundings sensor system or further sensors situated in the vehicle. The energy absorber may therefore represent a detached system. The energy absorber may have an interface, via which additional information may be received, for example, from a surroundings sensor system. In this case, the sensor of the energy absorber may be used for the fine adjustment of the stiffness, for example. Furthermore, the information about the impact magnitude may be provided via the interface to further vehicle systems. The sensor may be designed to provide the information about the impact magnitude in the form of a sensor signal directly to the setting element or alternatively to a controller for activating the setting element. The setting element may be a mechanical component, by which the stiffness of the energy absorber may be set. For this purpose, for example, the setting element may set the stiffness of at least one absorption element of the energy absorber. For example, the stiffness may be set to a high stiffness value if the information about the impact magnitude indicates a high impact energy. Correspondingly thereto, the stiffness may be set to a low stiffness value if the information about the impact magnitude indicates a low impact energy.

The energy absorber may have a first absorption element and the sensor may be coupled to the first absorption element in order to detect the impact magnitude. The impact magnitude may therefore be detected directly at the energy absorber. The first absorption element may be situated on a front side of the energy absorber, on which the impact magnitude acts first.

In this case, the sensor may be situated in the first absorption element. In this way, the sensor may be integrated into a space-saving and protected way in the energy absorber.

Furthermore, the energy absorber may have a second absorption element. The setting element may be designed to set a stiffness of the second absorption element to a high stiffness or a low stiffness. Independently of the setting of the second absorption element, the second absorption element may have a higher stiffness than the first absorption element.

According to one specific embodiment, the second absorption element may have a first element and a second element. The low stiffness may result through friction between the first element and the second element. Therefore, the second absorption element may be a friction element, which is designed to dissipate at least a part of the impact energy by friction.

For example, the setting element may be designed to cause the high stiffness of the second absorption element by tilting or locking between the first element and the second element. The high stiffness may be implemented simply in this way. The setting element may therefore be a tilting element, which may have one or more pins, for example, whose position may be changed in response to the information about the impact magnitude.

The present invention further provides an example method for setting a stiffness of an energy absorber, having the following steps: detecting an impact magnitude acting on the energy absorber; providing information about the impact magnitude; and setting the stiffness of the energy absorber as a function of the impact magnitude. The impact magnitude acting on the energy absorber may be detected directly on the energy absorber, for example, using a sensor integrated into the energy absorber.

For example, the impact magnitude may be detected based on a deformation of the energy absorber. In this way, the stiffness of the energy absorber may be set independently of an external sensor system.

Furthermore, the present invention provides an example control unit, which is designed to carry out or implement the steps of the method according to the present invention. An object on which the present invention is based may also be achieved rapidly and efficiently by this embodiment variant of the present invention in the form of a control unit.

A control unit may be understood in the present case as an electrical device, which processes sensor signals and outputs control signals as a function thereof. The control unit may have an interface, which may be designed in hardware and/or software. In the case of a hardware design, the interfaces may be part of a so-called ASIC system, for example, which includes greatly varying functions of the control unit. However, it is also possible that the interfaces are separate, integrated circuits or at least partially include discrete components. In the case of a software design, the interfaces may be software modules, which are provided on a microcontroller in addition to other software modules, for example.

An example computer program product having program code is also advantageous, which is stored on a machine-readable carrier such as a semiconductor memory, a hard drive memory, or an optical memory and is used to carry out the example method according to one of the above-described specific embodiments when the program is executed on a control unit.

BRIEF DESCRIPTION OF THE DRAWINGS

The present invention is explained in greater detail below for exemplary purposes on the basis of the figures.

DETAILED DESCRIPTION OF EXAMPLE EMBODIMENTS

Figure 1:
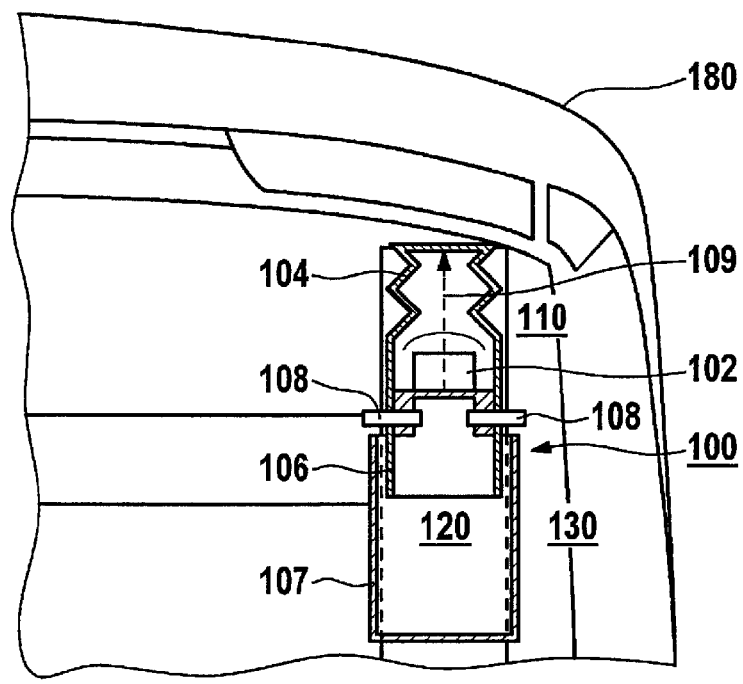
FIG. 1 shows a schematic view of an energy absorber in an initial position, according to an exemplary embodiment of the present invention.

In the following description of preferred exemplary embodiments of the present invention, identical or similar reference numerals are used for similarly acting elements shown in the various figures, a repeated description of these elements being omitted.

FIG. 1 shows a view of an energy absorber 100 according to an exemplary embodiment of the present invention. Energy absorber 100 may be situated in a vehicle and may include a sensor 102, a first absorption element 104 having a first stiffness, a second absorption element 106, 107 having a second stiffness, and a setting element 108. The first stiffness may be less than the second stiffness. According to the exemplary embodiment shown in FIG. 1, sensor 102 may be situated in first absorption element 104. Sensor 102 may be designed to detect a deformation 109 of first absorption element 104, for example, as a result of an impact of an object on the vehicle, and to provide the energy or force acting on the energy absorber to setting element 108 as information about a magnitude. Setting element 108 may be designed to set the second stiffness of second absorption element 106, 107 based on the information.

FIG. 1 especially shows a view of an adaptive energy absorber or an adaptive crash box 100 having integrated sensor 102 in the right front vehicle section. A longitudinal girder having the adaptive energy absorber may be identified by reference numeral 100.

The adaptive energy absorber may be functionally divided into three parts 110, 120, 130, first part 110 being able to represent an FGS area, second part 120 a low-speed area, and third part 130 a high-speed area. The energy absorber may be situated in the front vehicle area behind a bumper or a crossbeam 180.

First part 110 may represent a fully elastic area, which may be implemented as a spring, for example. Predictive sensor system 102 may also be integrated into first area 110. Sensor system 102 may be implemented, for example, as a high-frequency (HF) distant sensor, a laser scanner, a capacitive sensor, or as any other desired sensor, which may measure a change of distance 109 in relation to time, or may measure the speed directly. Second part 102 may include two components 106, 107 placed one inside the other, which may generate a defined counterforce via friction. Third part 130 may be formed by identical tubes 106, 107. However, they are now tilted one inside the other, for example, by one or more splints 108, as shown in FIG. 1. Correspondingly, the deformation may generate a high counterforce in the tilted or locked mode. Splints 108 may be guided through corresponding openings of tube 106. A change of the position of splint 108 may be carried out using corresponding actuators, which may respond to the information provided by sensor 102.

At the beginning of an impact, spring 104 in first area 110 will be compressed at different speeds depending on the type and severity of the impact. This movement may be detected and analyzed via sensor system 102. In response thereto, locking 108 may or may not be disengaged. As a function of whether or not locking 108 is disengaged, tubes 106, 107 may move inside one another and dissipate the impact energy through friction, or tilt inside one another and therefore dissipate the impact energy through deformation.

Figure 2:
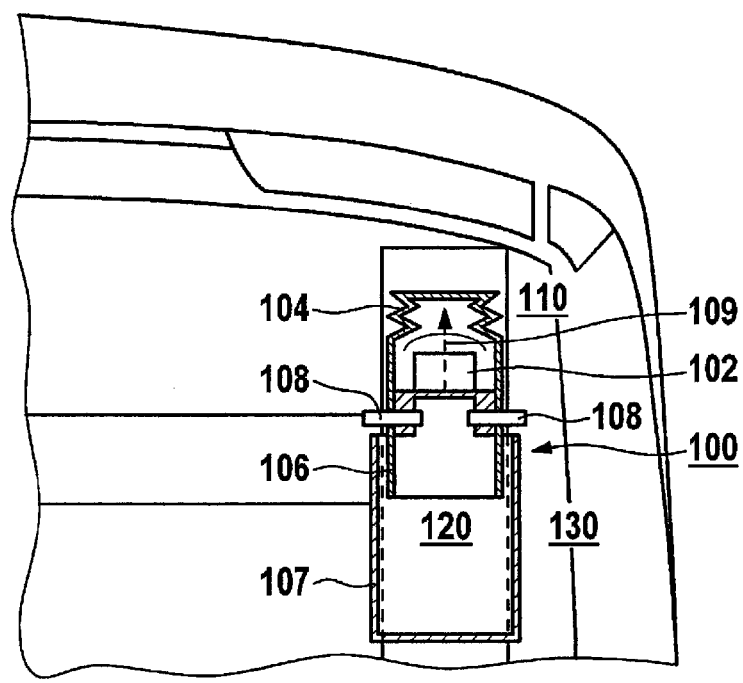
FIG. 2 shows a schematic view of the example energy absorber according to the present invention in the case of a large impact magnitude.
Figure 3:
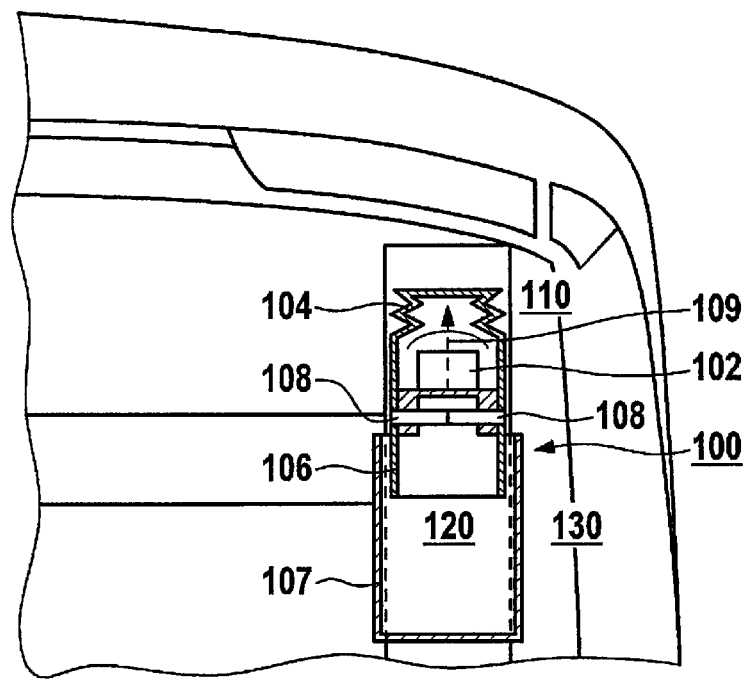
FIG. 3 shows a schematic view of the example energy absorber according to the present invention in the case of a small impact magnitude.

FIGS. 2 and 3 show a view of adaptive energy absorber 100 from FIG. 1, an implementation having large counterforce being shown in FIG. 2 and an implementation having small counterforce being shown in FIG. 3.

FIG. 2 shows energy absorber 100 for a high-speed impact. Elastic component 104 has been compressed by the impact, sensor 102 having measured a large impact energy via distance measuring section 109 and having provided corresponding information. On the basis of this information, splints 108 remain in their extended position. In this case, the state of energy absorber 100 is not changed by the information of sensor 102, since splints 108 are already located in the extended position. Tilting of tubes 106, 107 can occur during progressing deformation of energy absorber 100 due to the position of the splints. Because tubes 106, 107 are tilted, they will deform or compress irreversibly and therefore absorb a high energy of the impact.

Energy absorber 100 for a low-speed impact is shown in FIG. 3. According to FIG. 2, elastic component 104 has been compressed by the impact, sensor 102 having measured a smaller impact energy via distance measuring section 109 than during the high-speed impact shown in FIG. 2. On the basis of the information provided by sensor 102, splints 108 may be introduced into the interior of energy absorber 100, so that during progressing deformation of the energy absorber, tubes 106, 107 may be pushed one inside the other. Only the friction force between tubes 106, 107 acts as an energy absorber. The movement between tubes 106, 107 may be reversible.

Although only one energy absorber is shown on the vehicle right front side in FIGS. 1 through 3, a vehicle equipped with such an occupant protection system typically has a further energy absorber identical in construction and function on the vehicle left front side. Furthermore, the energy absorber according to the present invention may also be used at further positions of the vehicle.

Figure 4:
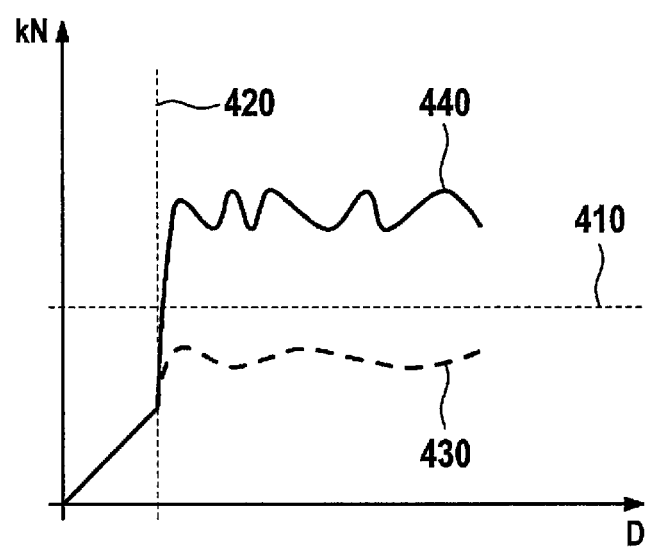
FIG. 4 shows a view of force curves for different states of the example energy absorber according to the present invention.

FIG. 4 shows a graph of force curves for the states of the energy absorber described in FIGS. 2 and 3, according to an exemplary embodiment of the present invention. A coordinate system is shown, a deformation depth D being plotted on the abscissa and an impact energy in kN being plotted on the ordinance. A threshold value 410 for an impact force is plotted on the ordinate. A further threshold value 420 for a deformation depth is plotted on the abscissa. Threshold value 420 represents a boundary value between an elastic deformation and a plastic deformation. A deformation depth which is less than threshold value 420 represents an elastic deformation, and a deformation depth which is greater than threshold value 420 represents a plastic deformation of the energy absorber. In the coordinate system shown in FIG. 4, force curves 430, 440 are plotted as a function of the deformation. Force curve 430 represents a force deformation curve for a low-speed impact, i.e., an impact at lower speed, and force curve 440 represents a force deformation curve for a high-speed impact, i.e., an impact at higher speed, for example, greater than 40 km/h.

It is apparent from FIG. 4 that curves 430 and 440 run congruently from the beginning of the impact until reaching threshold value 420. This is the range which corresponds to the compression of the fully elastic area of the energy absorber. Threshold value 410 may define the force, which, when it is exceeded, may result in a displacement of the splint shown in FIG. 1 and therefore tilting of the tubes of the friction element. Exceeding threshold value 410 by curve 440 therefore marks the implementation of tilting of the components of the energy absorber which are placed one inside the other, so that the high impact energy of the high-speed impact may be absorbed appropriately by the resulting deformation of the components. In the case of a low-speed impact, corresponding force curve 430 will not exceed threshold value 410, since the impact energy is absorbed by friction between the components.

Figure 5:
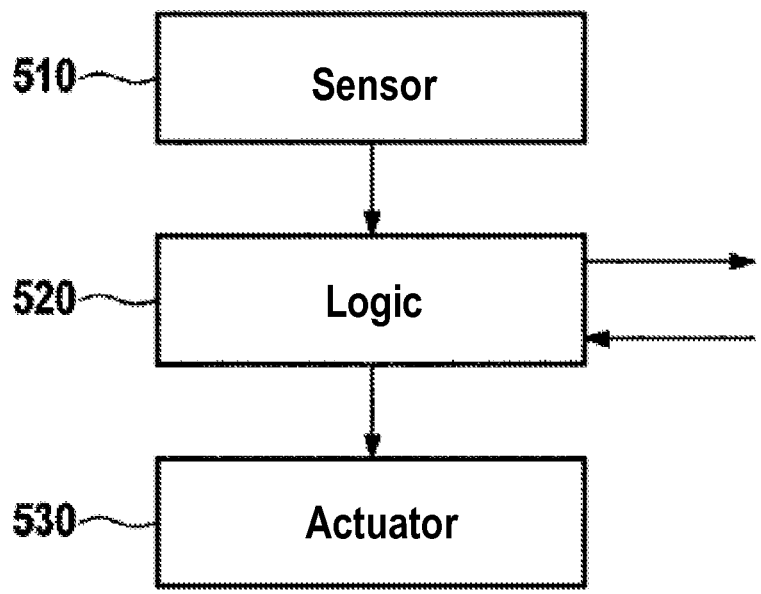
FIG. 5 shows a block diagram of components in an energy absorber according to an exemplary embodiment of the invention.

FIG. 5 shows a block diagram of E/E components (electrical/electronic components) in an adaptive crash absorber, according to an exemplary embodiment of the present invention. A sensor 510, a logic 520, and an actuator 530 are shown. Logic 520 has an interface for outputting a signal (OUT) and for receiving a signal (IN).

Sensor 510 may be designed to provide information about the impact magnitude to logic 520. Logic 520 may be designed to analyze the information. For this purpose, logic 520 may be designed, for example, to compare the impact magnitude to the threshold value shown in FIG. 4 and to provide a control signal to actuator 530 in accordance with a comparison result, in order to set the stiffness of the energy absorber in accordance with the impact magnitude. Via the interface (IN/OUT), on the one hand, communication may be performed with the adaptive crash absorber of the other side of the vehicle. On the one hand, the states of the crash absorber may be sent to the airbag control unit, in order to modify the trigger thresholds for the restraining devices depending on the situation and/or state. Furthermore, with the aid of the information of the sensors in the adaptive crash absorbers, the upfront sensor function may be implemented. In addition, the information from the adaptive crash absorbers may be used for further systems of active and passive safety.

Figure 6:
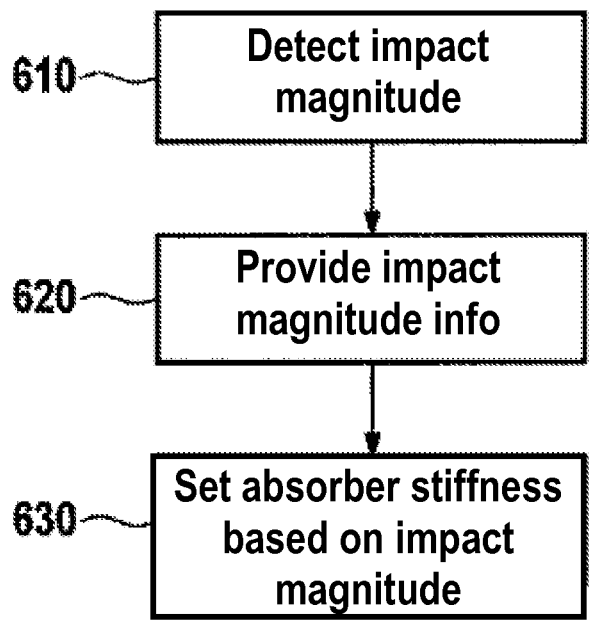
FIG. 6 shows a flow chart of a method according to an exemplary embodiment of the present invention.

FIG. 6 shows a flow chart of an exemplary embodiment of the present invention as a method for setting a stiffness of an energy absorber according to the present invention, which may be used in a vehicle, for example. The method has a first step 610, in which an impact magnitude acting on the energy absorber may be detected. The detection of the impact magnitude may be performed using a sensor situated in or on the energy absorber, for example. Information about the impact magnitude may be ascertained based on a deformation of the energy absorber. In a following step 620, the information about the impact magnitude may be provided. In a subsequent step 630, the stiffness of the energy absorber may be set as a function of the impact magnitude. The setting of the stiffness is generally performed via a controller using a setting element. For example, the energy absorber may be set to two or more different stiffness values as a function of the impact magnitude.

The described exemplary embodiments which are shown in the figures are only selected as examples. Different exemplary embodiments may be combined with one another completely or in regard to individual features. One exemplary embodiment may also be supplemented by features of a further exemplary embodiment. Furthermore, method steps according to the present invention may be repeated and executed in a sequence other than that described.

If an exemplary embodiment includes an "and/or" link between a first feature and a second feature, this may be read to mean that the exemplary embodiment has both the first feature and also the second feature according to one specific embodiment and has either only the first feature or only the second feature according to a further specific embodiment.

What is claimed is:

1. An energy absorber for a vehicle, comprising:
   a sensor configured to detect an impact magnitude acting on the energy absorber and provide information about the impact magnitude;
   at least one setting element configured to set a stiffness of the energy absorber in response to the information about the impact magnitude;

a first absorption element to which the sensor is coupled to detect the impact magnitude; and a second absorption element, wherein the at least one setting element is configured to set a stiffness of the second absorption element to a high stiffness by tilting between the first absorption element and the second absorption element.

2. The energy absorber as recited in claim 1, wherein the sensor is situated in the first absorption element.

3. The energy absorber as recited in claim 1, wherein the setting element is further configured to set a stiffness of the second absorption element to a low stiffness.

4. The energy absorber as recited in claim 3, wherein the second absorption element includes a first element and a second element, and the low stiffness results through friction between the first element and the second element.

5. A method for setting a stiffness of an energy absorber that includes a first absorption element and a second absorption element, the method comprising:
    detecting, by a sensor coupled to the first absorption element, an impact magnitude acting on the energy;
    providing, by the sensor and to a setting element, information about the impact magnitude; and
    setting, by the setting element, the stiffness of the energy absorber as a function of the impact magnitude, wherein the setting includes setting a stiffness of the second absorption element to a high stiffness by tilting between the first absorption element and the second absorption element.

6. The method as recited in claim 5, wherein the impact magnitude is detected based on a deformation of the energy absorber.

7. A control unit, comprising:
    a computer processor configured to obtain information about a detected impact magnitude acting on an energy absorber and set a stiffness of the energy absorber as a function of the impact magnitudes;
    wherein:
        the energy absorber includes a first absorption element and a second absorption element; and
        the setting of the stiffness includes setting a stiffness of the second absorption element to a high stiffness by causing tilting between the first absorption element and the second absorption element.

8. A non-transitory computer-readable storage medium storing program code, the program code, when executed on a control unit, causing the control unit to perform the steps of:
    setting a stiffness of an energy absorber as a function of a detected impact magnitude acting on the energy absorber;
    wherein:
        the energy absorber includes a first absorption element and a second absorption element; and
        the setting includes setting a stiffness of the second absorption element to a high stiffness by causing tilting between the first absorption element and the second absorption element.

\* \* \* \* \*

UNITED STATES PATENT AND TRADEMARK OFFICE
CERTIFICATE OF CORRECTION

PATENT NO. : 8,649,937 B2  Page 1 of 1
APPLICATION NO. : 13/386086
DATED : February 11, 2014
INVENTOR(S) : Freienstein et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 37 days.

Signed and Sealed this
Twenty-ninth Day of September, 2015

Michelle K. Lee
*Director of the United States Patent and Trademark Office*